(12) United States Patent
Seedorff

(10) Patent No.: US 6,315,335 B1
(45) Date of Patent: Nov. 13, 2001

(54) TWO-PIECE LOOSE FLANGE

(75) Inventor: Peter Seedorff, CH-Ettingen (CH)

(73) Assignee: Etoile Holding AG, Ettingen (CH)

( * ) Notice: Subject to any disclaimer, the term of this patent is extended or adjusted under 35 U.S.C. 154(b) by 0 days.

(21) Appl. No.: 09/367,632

(22) PCT Filed: Feb. 6, 1998

(86) PCT No.: PCT/CH98/00045

§ 371 Date: Aug. 19, 1999

§ 102(e) Date: Aug. 19, 1999

(87) PCT Pub. No.: WO98/38446

PCT Pub. Date: Sep. 3, 1998

(30) Foreign Application Priority Data

Feb. 26, 1969 (CH) ........................................... 463/97
Feb. 26, 1997 (CH) ........................................... 462/97

(51) Int. Cl.[7] ........................................... F16L 23/00
(52) U.S. Cl. ........................... 285/415; 285/412; 285/414
(58) Field of Search ................................. 285/413, 415, 285/412, 414, 56, 405

(56) References Cited

U.S. PATENT DOCUMENTS 1,556,745 * 10/1925 Banta ..................................... 285/415
4,338,879 * 7/1982 Makeev .
5,314,215    5/1994 Weinhold .

FOREIGN PATENT DOCUMENTS 19514003  11/1995  (DE) .
 0523518   1/1993  (EP) .
 1206231   2/1960  (FR) .
 8600971   2/1986  (WO) .

* cited by examiner

*Primary Examiner*—Teri Pham Luu
(74) *Attorney, Agent, or Firm*—Selitto, Behr & Kim

(57) ABSTRACT

The inventive loose flange (1) consists of two half flanges (2, 2) overlapping each other in two overlap areas. A connector screw hole (4, 5), traversing both half flanges (2, 3), is located in one of the two overlap areas. Another connector screw hole (6, 7) is disposed in each of the two half flanges (2, 3), said screw hole being set at a 90° angle to the first. The overlap areas of both half flanges (2, 3) have stepped, interlocking profiles (21, 22, 31, 32) which serve to absorb shearing force. By using connector screws to connect two loose flanges, for instance, in both half flange (2, 3) overlap areas, all connector screws, i.e. even those arranged in screw holes (6, 7) located outside the overlap areas, can be tightened to a substantially greater degree.

16 Claims, 3 Drawing Sheets

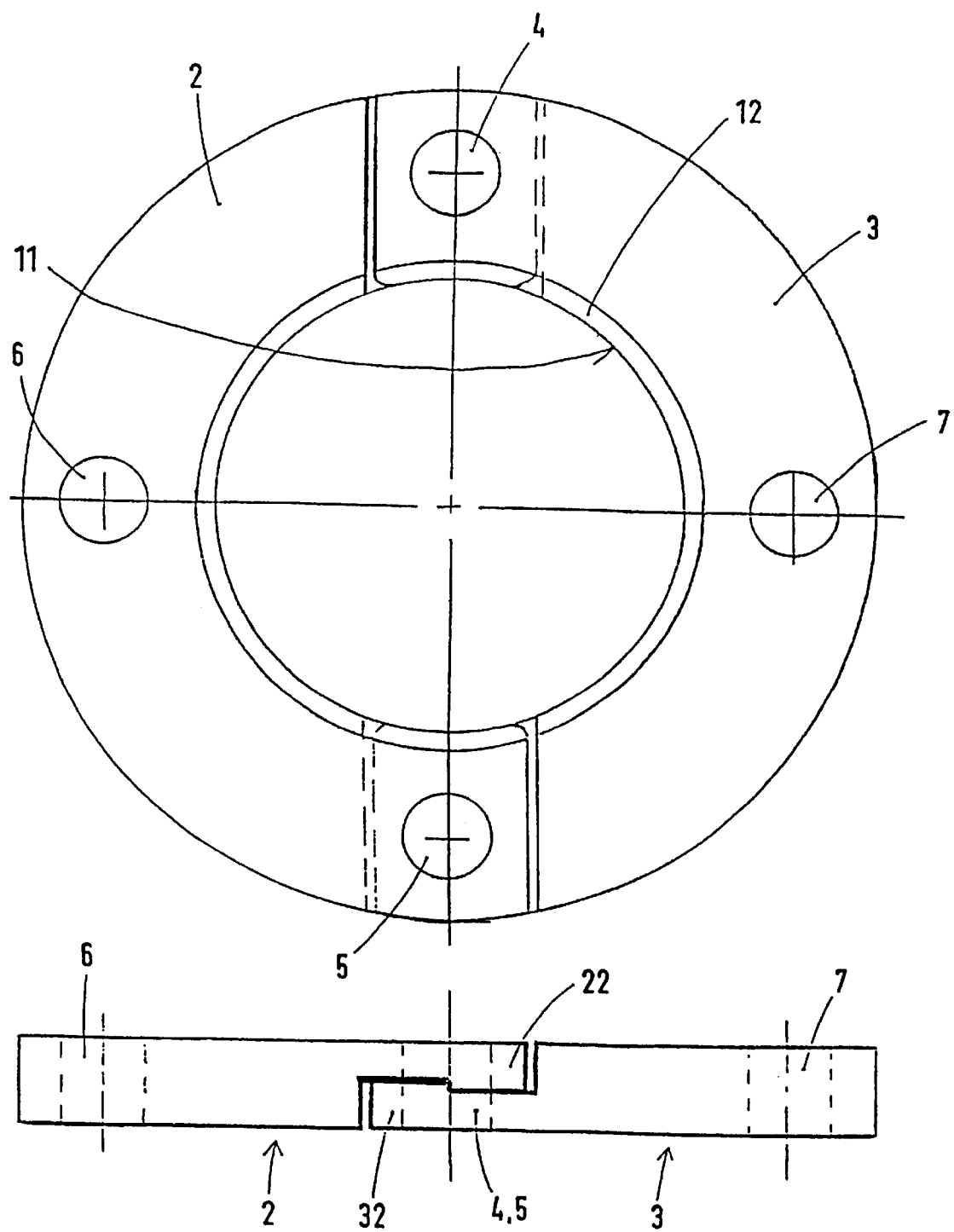

TWO-PIECE LOOSE FLANGE

FIELD OF THE INVENTION

The present invention relates to a two-piece loose flange as defined in the preamble of independent patent claim 1.

BACKGROUND OF THE INVENTION

Loose flanges are used, in particular, for the purpose of connecting components, e.g. pipes, which are provided with collars as a support for the loose flanges. For this purpose, a loose flange which rests on the collar of a first component and a loose flange which rests on the collar of a second component are screwed to one another by means of connecting screws, with the result that they compress the collars located between them, and thus the components. Arranged between the collars is a seal which ensures sealing and in the case of a sufficiently thick configuration, e.g. in the form of a corrugated steel ring, also produces the restoring forces which are necessary for the stable screw-connection of the loose flanges under changing operating conditions.

Loose flanges which comprise two flange halves, overlap in two overlapping regions and are screwed to one another there by means of relatively small flange screws are known. Outside the overlapping regions, said loose flanges have screw holes for connecting screws, which serve for connecting the loose flange to a further loose flange or another connecting part.

These loose flanges have the disadvantage that, during the connection of two loose flanges or of a loose flange to another connecting part, the tightening of the connecting screws results in the connection of the two flange halves being subjected to canting and shearing forces, which only permit limited tightening of the connecting screws, since otherwise the flange screws rupture.

SUMMARY OF THE INVENTION

In view of the disadvantages of the already known loose flanges described above, the object of the invention is to provide a loose flange of the type mentioned in the introduction in the case of which the shearing forces acting on the flange halves during tightening of the connecting screws are compensated for by the two flange halves themselves.

This object is achieved by the loose flange according to the invention as defined in independent patent claim 1. Patent claim 8 relates to a use of the loose flange according to the invention. Preferred variants can be gathered from the dependent patent claims.

The essence of the invention resides in the fact that, in the case of a two-piece loose flange with two flange halves, which overlap in two overlapping regions, and at least four screw holes for connecting screws, which serve for connecting the loose flange to a further loose flange or another connecting part, it being the case that a connecting screw hole is arranged in the two overlapping regions, the two flange halves have profiles which interengage in a step-like or tooth-like manner and are intended for absorbing the shearing forces acting on the flange halves during the tightening of the connecting screws, it being the case that at least one connecting screw hole runs through a step transition.

By virtue of the fact that the shearing forces are absorbed by profiles which interengage in a step-like or tooth-like manner, it is possible to provide better calculations for connections of loose flanges according to the invention. Moreover, it is not necessary for the shearing forces to be compensated for by the connecting screws, with the result that the latter are subjected to less pronounced loading.

In the case of the loose flange according to the invention, for the loose-flange connections, it is possible to calculate, at least partially, the main forces and the secondary forces.

BRIEF DESCRIPTION OF THE DRAWINGS

The loose flange according to the invention is described in more detail hereinbelow by way of an exemplary embodiment and with reference to the attached drawings, in which:

FIG. 2 shows a plan view of the loose flange of FIG. 1;

FIG. 3 shows a side view of the loose flange of FIG. 1; and

DETAILED DESCRIPTION OF THE INVENTION

Figure 1:
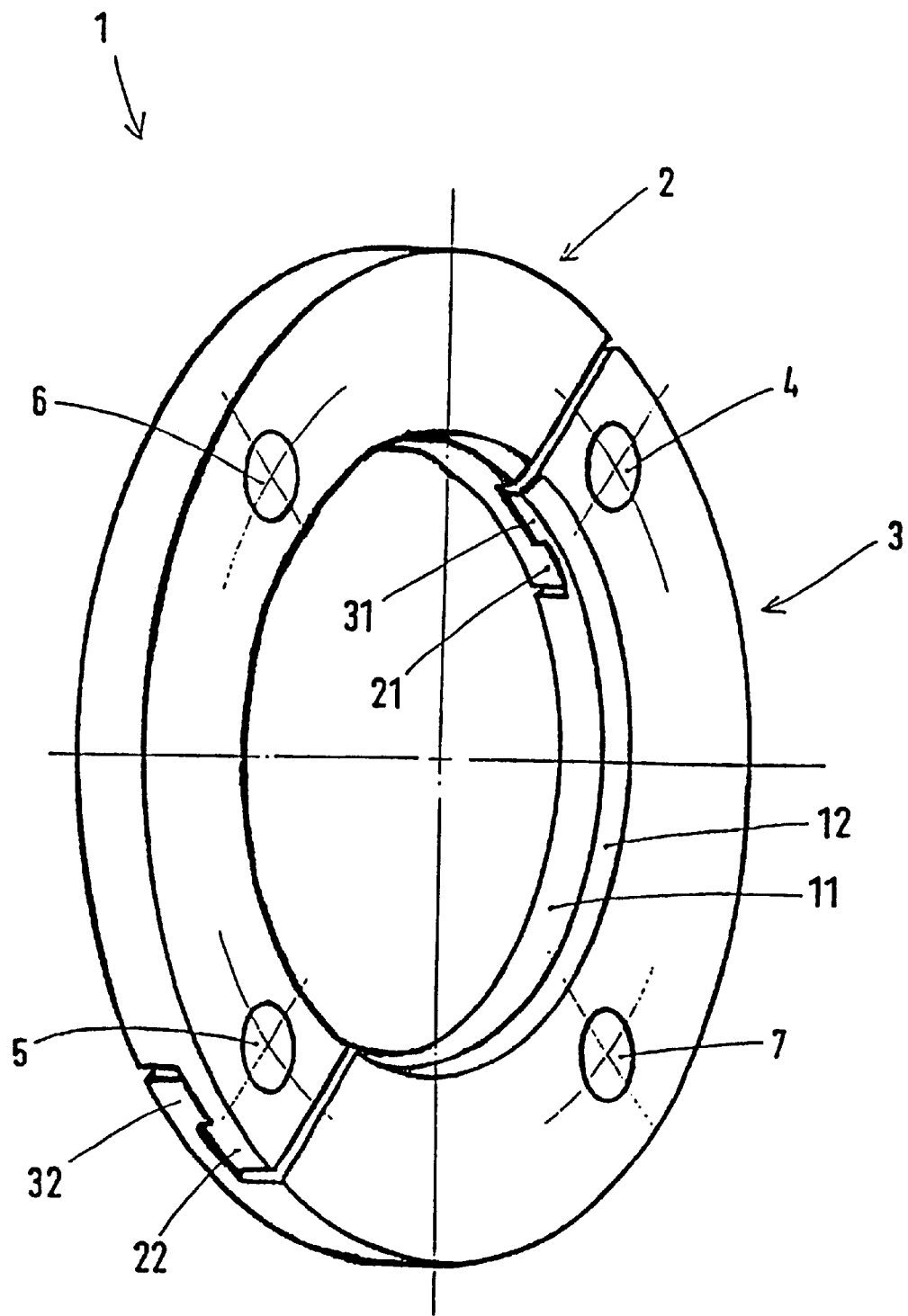
FIG. 1 shows a perspective view of a loose flange according to the invention with overlapping regions with step-like profiles.
Figure 4:
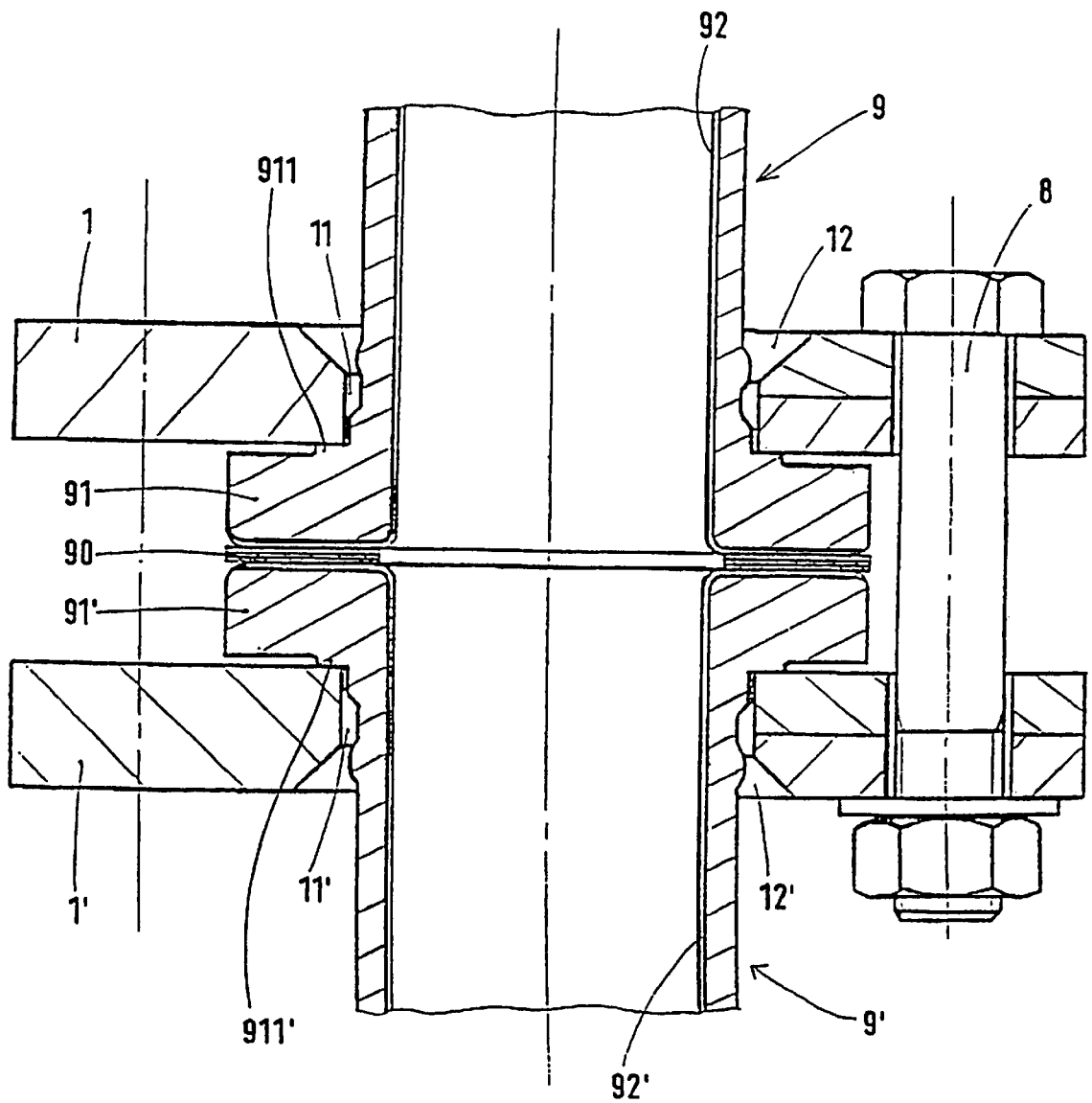
FIG. 4 shows the use of two loose flanges according t FIG. 1 for the purpose of connecting two steel-enameled pipes.

FIGS. 1 to 3

The illustrated loose flange 1 according to the invention comprises two flange halves 2 and 3, which overlap in two overlapping regions. Arranged in each of the two overlapping regions is a connecting screw hole 4 or 5 which passes through the two flange halves 2, 3. Offset by 90° with respect to said holes 4 and 5, a further connecting screw hole 6 is arranged in the flange half 2 and a further connecting screw hole 7 is arranged in the flange half 3. With inner flange diameters of from 35 to 230 mm and outer flange diameters of from 100 to 350 mm, the diameter of the connecting screw holes 4 to 7 is, for example, between approximately 14 and 25 mm.

The overlapping regions of the two flange halves 2, 3 have step-like, interengaging profiles 21, 22, 31, 32 which serve for absorbing the shearing forces.

The inside of the loose flange 1 comprises a cylindrical side surface 11 and a funnel-like slope 12.

FIG. 4

Two loose flanges 1 and 1' serve here for pressing two pipe ends 9 and 9' against one another. The pipe ends 9, 9' are respectively provided with collars 91 and 91', which respectively have annular shoulders 911 and 911' on which the loose flanges 1 and 1' rest respectively, with the result that the pressing forces act on the collars 91 and 91' as closely as possible to the pipe within. On the inside, the pipe ends 9, 9' are respectively lined with a layer of chemical enamel 92, 92' or the like. Arranged between the two pipe ends 9, 9' is an annular seal 90 which ensures sealing.

The loose flanges 1 and 1' are screwed to one another by means of four or more connecting screws 8, only one of these screws being depicted here.

It can clearly be seen that the insides of the loose flanges 1 and 1' respectively have a cylindrical side surface 11, 11' and a funnel-like slope 12, 12'.

It is possible to realize further design variations for the above described loose flanges, and express mention should also be made here of the following:

The number of connecting screw holes 4 to 7 may vary from 4 or more, depending on the nominal width.

The loose flange need not necessarily be in the form of a shallow cylinder. Planar side surfaces or combined forms are also conceivable.

Instead of step-like profiles 21, 22, 31, 32, it is also possible to use, for example, tooth-like profiles.

What is claimed is:

1. A two-piece loose flange having two flange halves which overlap in two overlapping regions, and at least four screw holes for connecting screw, which serve for connecting the loose flange to another connecting part, it being the case that a connecting screw hole is arranged in the two overlapping regions, characterized in that the two flange halves have profiles which interengage in a step-like manner in the overlapping regions and are intended for absorbing the shearing forces acting on the flange halves during tightening of the connecting screws, it being the case that at least one connecting screw hole runs through a step transition.

2. The two-piece loose flange as claimed in claim 1, characterized in that at least one step transition runs in a center axis of the loose flange.

3. The two-piece loose flange as claimed in claim 1 or 2, characterized in that at least one step transition runs parallel to the line connecting the center points of the connecting screw holes in the two overlapping regions.

4. The two-piece loose flange as claimed in claim 1 or 2, characterized in that, in addition to the connecting screw holes in the overlapping regions, at least one further connecting screw hole is provided per flange half.

5. The two-piece loose flange as claimed in claim 1 or 2, characterized in that the two flange halves are of essentially identical construction.

6. The two-piece loose flange as claimed in claim 1 or 2, characterized in that the inside of the loose flange is of partially cylindrical and partially funnel-like design.

7. The two-piece loose flange as claimed in claim 1 or 2, characterized in that the diameter of the connecting screw holes is at least 14 mm.

8. The two-piece loose flange as claimed in claim 1, characterized in that the connecting part includes another loose flange.

9. The two-piece loose flange as claimed in claim 1, characterized in that the profiles interengage in a tooth-like manner.

10. The use of a two-piece loose flange for the purpose of connecting components which are lined, the loose flange having two flange halves, which overlap in two overlapping regions, and at least four screw holes for connecting screws, which serve for connecting the loose flange to another connecting part, it being the case that a connecting screw hole is arranged in the two overlapping regions, characterized in that the two flange halves have profiles which interengage in a step-like manner in the overlapping regions and are intended for absorbing the shearing forces acting on the flange halves during tightening of the connecting screws, it being the case that at least one connecting screw hole runs through a step transition.

11. The use as claimed in claim 10, characterized in that the components have a pipe part and a collar with an annular shoulder which serves as loose flange support and is intended for the introduction of force in the vicinity of the pipe part, such that the loose flange rests just on the annular shoulder during the connection of two components, and an annular gap is provided on the outside, around the annular shoulder, between the collar and loose flange.

12. The use as claimed in claim 11, characterized in that the annular gap is greater than the maximum bending of the loose flange in the region of the collar during tightening of the connecting screws, with the result that the loose flanges produce a restoring force.

13. The use as claimed in claim 11 or 12, characterized in that the loose flange used is produced in a stable and precise manner and butts against the pipe part and against the annular shoulder in a positively locking manner.

14. The use as claimed in claim 10, characterized in that the connecting part includes another loose flange.

15. The use as claimed in claim 10, characterized in that the profiles interengage in a tooth-like manner.

16. The use as claimed in claim 10, characterized in that the connecting components are steel-enameled.

* * * * *